United States Patent [19]
Koch et al.

[11] Patent Number: 6,082,596
[45] Date of Patent: Jul. 4, 2000

[54] DISPENSER FOR STICK FORM SOLID EDIBLE FOODS, COMPONENTS THEREFOR AND METHODS OF MAKING THE SAME

[76] Inventors: Drake L. Koch, 3309 Genessee; Vijay S. Malik, 4405 Fairmount Ave., both of Kansas City, Mo. 64111

[21] Appl. No.: 09/165,495

[22] Filed: Oct. 2, 1998

[51] Int. Cl.[7] .................................................. G01F 11/00
[52] U.S. Cl. ......................... 222/390; 222/575; 424/87; 424/192 R
[58] Field of Search ..................... 222/390, 575; 425/87, 192 R, 376.1, 382 R, 461, 464

[56] References Cited

U.S. PATENT DOCUMENTS

| | | | |
|---|---|---|---|
| 980,804 | 1/1911 | La Rue | 222/390 |
| 1,335,998 | 4/1920 | St. Onge | 222/390 |
| 1,463,407 | 7/1923 | Sharp et al. . | |
| 2,489,667 | 11/1949 | Pennell | 424/376.1 |
| 2,845,707 | 8/1958 | Redmond | 31/21 |
| 2,928,533 | 3/1960 | Loucony | 222/575 |
| 2,980,247 | 4/1961 | DiGiantomasso | 206/56 |
| 3,750,913 | 8/1973 | Wild | 222/387 |
| 3,920,156 | 11/1975 | Hicks | 222/80 |
| 4,241,852 | 12/1980 | Klem | 222/103 |
| 4,544,083 | 10/1985 | Schroeder | 222/47 |
| 5,111,973 | 5/1992 | Mueller | 222/386 |

*Primary Examiner*—Andres Kashnikow
*Assistant Examiner*—Christopher S. Kim
*Attorney, Agent, or Firm*—Richard L. Marsh

[57] ABSTRACT

A solid-foods dispenser adapted to receive a stick of solid edible material and dispense the material in at least one ribbon of desired thickness is disclosed. The solid-foods dispenser comprises an elongate housing having structural walls defining a chamber bounded by terminal ends, the chamber having an internal configuration generally corresponding to the configuration of the stick of material to be dispensed. A first closure adapted to be removingly engaged to one end of the elongate housing has an advance associated therewith and a second closure adapted to be fitted to the other end of the elongate housing has an interchangeable die associated therewith. The advance has a plunger for dispensing the stick wherein the advance moves the plunger. The plunger has a forward end surface configured to mate with the interior surface of the second closure and is positioned within the housing and movable therewithin. The chamber is convergingly tapered from the one end to the other end throughout the length thereof.

20 Claims, 4 Drawing Sheets

DISPENSER FOR STICK FORM SOLID EDIBLE FOODS, COMPONENTS THEREFOR AND METHODS OF MAKING THE SAME

BACKGROUND OF THE INVENTION

1. Field of the Invention

This invention relates to a dispenser adapted to receive stick form solid-foods edible material therein and dispense the material therefrom.

2. Prior Art Statement

It is known to provide a dispenser for butter comprising a base, a cylindrical member having internal threads mounted for rotation on the base, a top plate freely engaging the cylindrical member, a plurality of guide members mounted in the top plate and extending to the base and a nut having external threads engaging the internal threads of the cylindrical member wherein the device may be readily disassembled for cleaning by releasing a handle below the base disengaging the guide members and wherein the cylinder is turned to raise the butter above the top plate for slicing along the top thereof. For instance, see the U.S. Pat. No. 2,845,707 issued on Aug. 5, 1958, to Benjamin Redmond.

It is also known to provide a device for dispensing butter from one end of an elongated housing having a square interior cross section having internal projections on the one end to prevent accidental discharge of the stick and wherein the other end has a closure fitted thereon with mating flanges having a threaded shaft with a turning nut on one end and a pressure plate on the other end. The threaded shaft must be backed out entirely and the closure lifted from the mating flanges before inserting another stick. For instance, see the U.S. Pat. No. 2,980,247 issued on Apr. 18, 1961 to Robert R. DiGiantomasso.

It is further known to provide a food dispenser comprising an inner casing forming a substantially rectangular elongated chamber open at both ends, an outer casing also forming an elongated chamber open at both ends, the inner casing telescoping within the outer casing. A plunger for the inner casing forces the stick through the outer casing. For instance, see U.S. Pat. No. 3,750,913 issued on Aug. 7, 1973 to Heinz K. Wild.

Another known patent in the art claims a device for incrementally dispensing a spreadable foodstuff from an elongate housing defining a chamber open at both ends having dimensions sufficient to matingly enclose a butter stick, a means for advancing the stick and a spatula for slicing a quantity of the protruding foodstuff. There is no mechanical advantage means for advancing the stick but indicia in a slotted opening at the discharge end are provided for determining the thickness of the slice. For instance, see the U.S. Pat. No. 3,920,156 issued on Nov. 18, 1975 to Leslie E. Hicks.

Those knowledgeable in the art will recognize that it is known to provide softened butter dispensed from pre-packaged envelopes through a closeable lip projecting from the lowermost edge of the front wall of the chamber wherein there is no mechanical advantage device and in fact requires squeezing the long dimension of the stick to dispense from a corner on the opposite side of the stick. For instance, see the U.S. Pat. No. 4,241,852 issued on Dec. 30, 1980 to Stanley J. Klem.

Additionally, it is known to provide a device for dispensing butter having a housing for containing the butter, a sealing means for providing sealing closure on an end opposite the dispensing end, the sealing closure adapted for receiving a screw threaded shaft of substantially the same length as the housing wherein the shaft penetrates the stick from one end to the other, the shaft further having a quick release screw for removing the shaft for cleaning once the butter is fully dispensed. For instance, see the U.S. Pat. No. 4,544,083 issued on Oct. 1, 1985 to Matt Schroeder.

It is also known to provide a discharge device for dispensing a food, the discharge device having no mechanical advantage and comprising, in part, a first guiding platform smaller than the diameter of the tube and a second sealing platform having a diameter greater than the diameter of the tube spaced from the first platform. For instance, see U.S. Pat. No. 5,111,973 issued on May 12, 1992 to Martin Mueller.

Finally, it is known to provide a tubular device with a screw advancing mechanism on one end and removable die shapes on the opposite end, similar to the well-known cookie press, wherein a knife is used to slice off pats of solid edible material, such as butter, off the chosen end die shape. For instance, see the device of Shawn A. Stewart offered for sale on the web site of Michael I. Kroll at http//www.invention.com.

SUMMARY OF THE INVENTION

Most prior art solid-foods dispensers comprising an elongate housing having structural walls defining a chamber bounded by terminal ends, wherein the chamber has an internal configuration generally corresponding to the configuration of the stick of material to be dispensed generally present the solid material at one end of the dispenser from which a desired quantity such as a pat is cut with a knife. Another prior art dispenser apparently further provides different shaped dies at the discharge end for defining different shaped pats. Yet another prior art dispenser further provides for dispensing a ribbon of material from one end of the dispenser under an adjustable plate fitted in a slot at the end of the chamber. All these dispensers either have no closed discharge end or have a die or closure plate that is subject to the entire force of the material being forced against same. Therefore, it is an object of this invention to provide a solid food dispenser adapted to receive a stick of solid edible material through one end and dispense the material in at least one ribbon of desired thickness from the other end, the solid-foods dispenser comprising an elongate housing having structural walls defining a chamber bounded by terminal ends, the chamber having an internal configuration generally corresponding to the configuration of the stick of material to be dispensed, the dispenser further having a first closure means associated with a loading end of the dispenser adapted to be removingly engaged from the open terminal end of the housing, a second closure means carried by the housing, wherein the second closure means also has an internal face facing toward the chamber, a plunger means positioned in the housing and movable from a position spaced from the second closure means along the longitudinal axis of the dispenser to a position adjacent the second closure means, the plunger having a mating face configured to mate with the internal face, advancing means associated with the first closure means, the housing and the plunger means and operable to move the plunger through the housing in the direction of the second closure means, and wherein the second closure means is positioned substantially adjacent the discharge end of the dispenser, is fixed to the housing, is adapted to receive removable die means, the die means defining a clearance between a discharge edge thereon and a bottom wall of the chamber.

It is another object of this invention to provide a solid-foods dispenser wherein a removable die means dispenses at least one ribbon of solid edible material having a width substantially greater than the thickness thereof.

Yet another object of this invention is to provide a solid-foods dispenser wherein a removable die means has multiple ports thereby adapted to dispense a ribbon comprising multiple streams of solid edible material wherein each stream has a width substantially equal to the thickness thereof.

Still another object of this invention is to provide a solid-foods dispenser wherein the plunger positioned in the housing and movable therein is made from a flexible elastomeric material and comprises a piston, a shaft and a retaining means, the piston being integral with one end of the shaft and the retaining means comprising a head being integral with the other end of the shaft and wherein the plunger has a force distributing washer disposed upon the shaft intermediate a pressure face of the piston and the terminal end of a screw shaft of an advancing means.

Those skilled in the art will appreciate that another object of this invention is to provide a solid-foods dispenser wherein the piston has a width and breadth, the width greater than the interior dimension of the width of the chamber at any point along the length thereof and the breadth greater than the interior dimension of the breadth of the chamber at any point along the length thereof, the piston further having a compound curvature comprising a mating face curvature and a rear face curvature on each of its orthogonal edges, the mating face curvature adapted for wiping surface contact with the interior surfaces of the chamber.

Another significant object of this invention is to provide a solid-foods dispenser wherein the shaft of the plunger elongates upon withdrawal of the advancing means thereby providing a one-way valve effect between the walls of the chamber and the piston.

Yet a further object of this invention is to provide a solid-foods dispenser wherein a first closure means comprises an end cap having internal threads adapted to be threadingly engaged upon an open end of an elongate housing, the closure means receiving a screw shaft of an advancing means in a threaded hole in the center thereof the internal threads having a multiple lead adapted for rapid removal of the first closure means from the elongate housing.

Still a further object of this invention is to provide a solid-foods dispenser wherein the structural walls of the chamber are convergingly tapered from the loading end to the discharge end thereof wherein the taper is less than two degrees, preferably less than one degree and most preferably is six tenths of one degree.

Skilled artisans will appreciate that another object of this invention is to provide a solid-foods dispenser adapted to receive a stick of solid edible material and dispense the material in a solid stream onto a substrate, the dispenser comprising an elongate housing having rectilinear structural walls bounded by terminal ends, one of the terminal ends defining a loading end of the dispenser, the one terminal end having removable closure means associated therewith, the other of the terminal ends defining a discharge end of the dispenser, the other terminal end having a fixed closure means formed integrally therewith defining a pressure plate therewithin for removably receiving and retaining removable die means thereupon.

Yet another object of this invention is to provide a solid-foods dispenser wherein the removable closure means has an advance means associated therewith, the advance means having a plunger means on one end thereof positioned in the housing and movable along the longitudinal axis of the dispenser, the advance means forcing at least one solid stream of the stick of solid edible material through the discharge slot.

Finally, it is an object of this invention is to provide a solid-foods dispenser adapted to receive a stick of solid edible material and dispense the material in at least one ribbon of desired thickness, the solid-foods dispenser comprising an elongate housing having structural walls bounded by terminal ends defining a chamber, the chamber having an internal configuration generally corresponding to the configuration of the stick of material to be dispensed; a first closure means removably associated with a loading end of the dispenser, the first closure means having an advance means associated therewith; a second closure means on a discharge end of the dispenser having interchangeable die means associated therewith, a plunger means positioned in the housing and movable from a position spaced from the second closure means along the longitudinal axis of the dispenser to a position adjacent the second closure means, the advance means moving the plunger, the plunger having a mating face configured to mate with the interior surface of the second closure means, the improvement wherein the chamber of the dispenser is convergingly tapered from the loading end to the discharge end throughout the length thereof

DESCRIPTION OF THE PREFERRED EMBODIMENTS

While the various features of this invention are hereinafter described and illustrated as a solid-foods dispenser comprising an elongate housing having structural walls defining a chamber bounded by terminal ends, it is to be understood that the various features of this invention can be used singly or in various combinations thereof to receive a stick of solid edible material and dispense the material in at least one ribbon of desired thickness as can hereinafter be appreciated from a reading of the following description.

Figure 1:
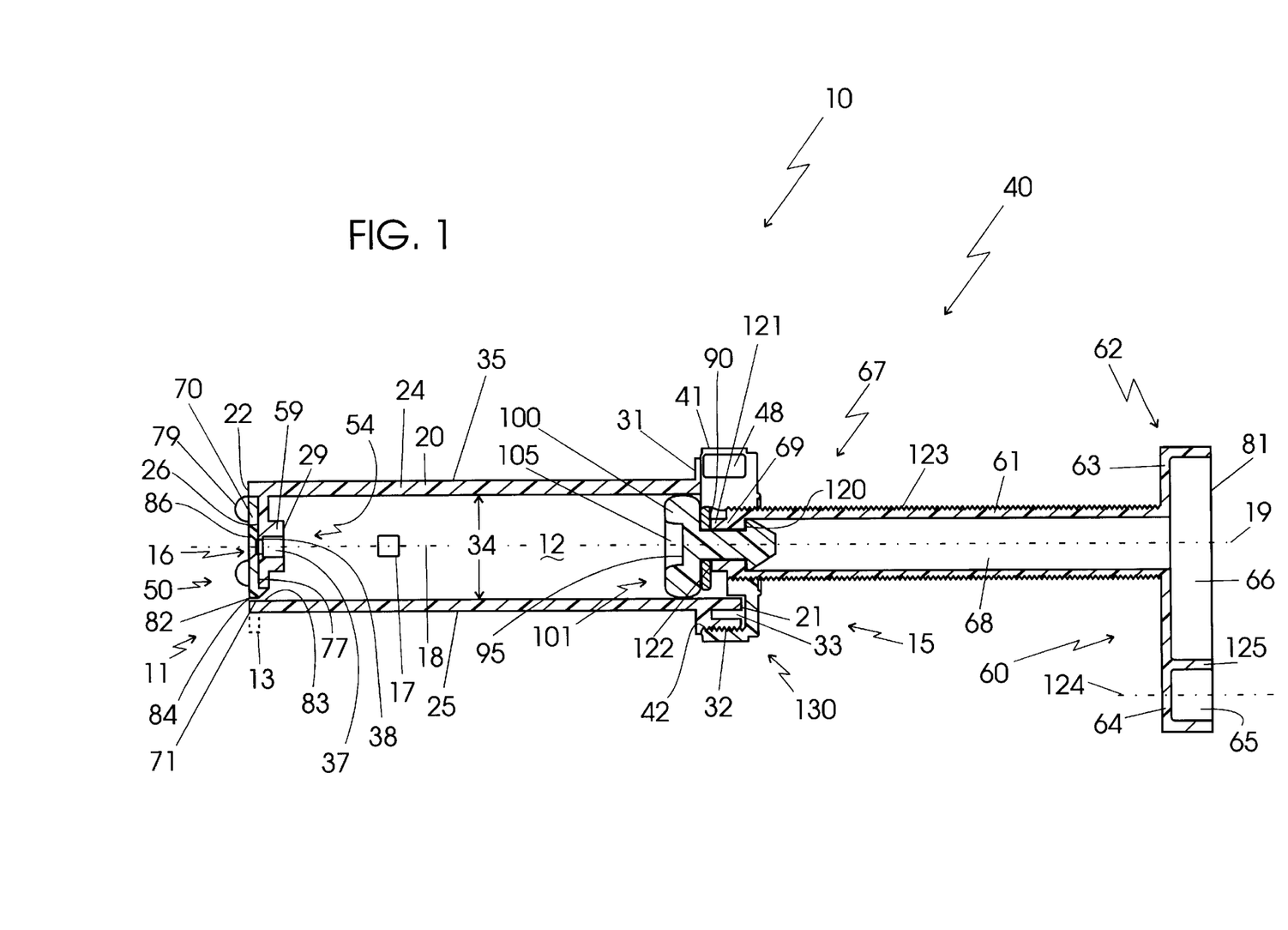
FIG. 1 is a plan view of the preferred embodiment of the solid foods dispenser of this invention having all parts in section and showing the flats on a first closure means.

Referring now to FIG. 1, the preferred embodiment of the solid-foods dispenser generally described with the numeral 10 is adapted to receive a stick of solid edible material (not shown) and dispense the material in at least one ribbon of desired thickness. Solid-foods dispenser 10 comprises an elongate housing 20 having structural walls 24, 25 defining a chamber 12 bounded by terminal ends 21, 22. Chamber 12 has an internal configuration generally corresponding to the configuration of the stick of material to be dispensed. A first closure means generally shown by the numeral 40 is associated with a loading end 15 of solid-foods dispenser 10 and is adapted to be removingly engaged from open terminal end 21 of housing 20. A second closure means generally described by the numeral 50 comprises a pressure plate 23 carried by housing 20, die means 70 and retaining means 16, pressure plate 23 having an internal face 54 facing toward chamber 12. A plunger means generally described by the numeral 95 is positioned in housing 20 and is movable from a position spaced from second closure means 50 along the longitudinal axis 18 of dispenser 10 to a position adjacent second closure means 50, plunger means 95 having a mating face 101 configured to mate with internal face 54. An advancing means generally described by numeral 60 is associated with first closure means 40, housing 20 and plunger means 95 and operable to move plunger means 95 through housing 20 in the direction of second closure means 50. It has been found by the teachings of this invention that an improvement over the art is achieved when second closure means 50 is positioned substantially adjacent the discharge end 11 of dispenser 10, has a portion 59 thereof fixed to housing 20, portion 59 adapted to receive removable die means 70 and wherein die means 70 defines a clearance 84 between a discharge edge 71 thereon and the inside surface 83 of structural wall 25 of chamber 12. Clearance 84 thus defines at least one discharge port 82, hereinafter further defined, through which at least one ribbon of solid material from the stick is expressed.

Figure 2:
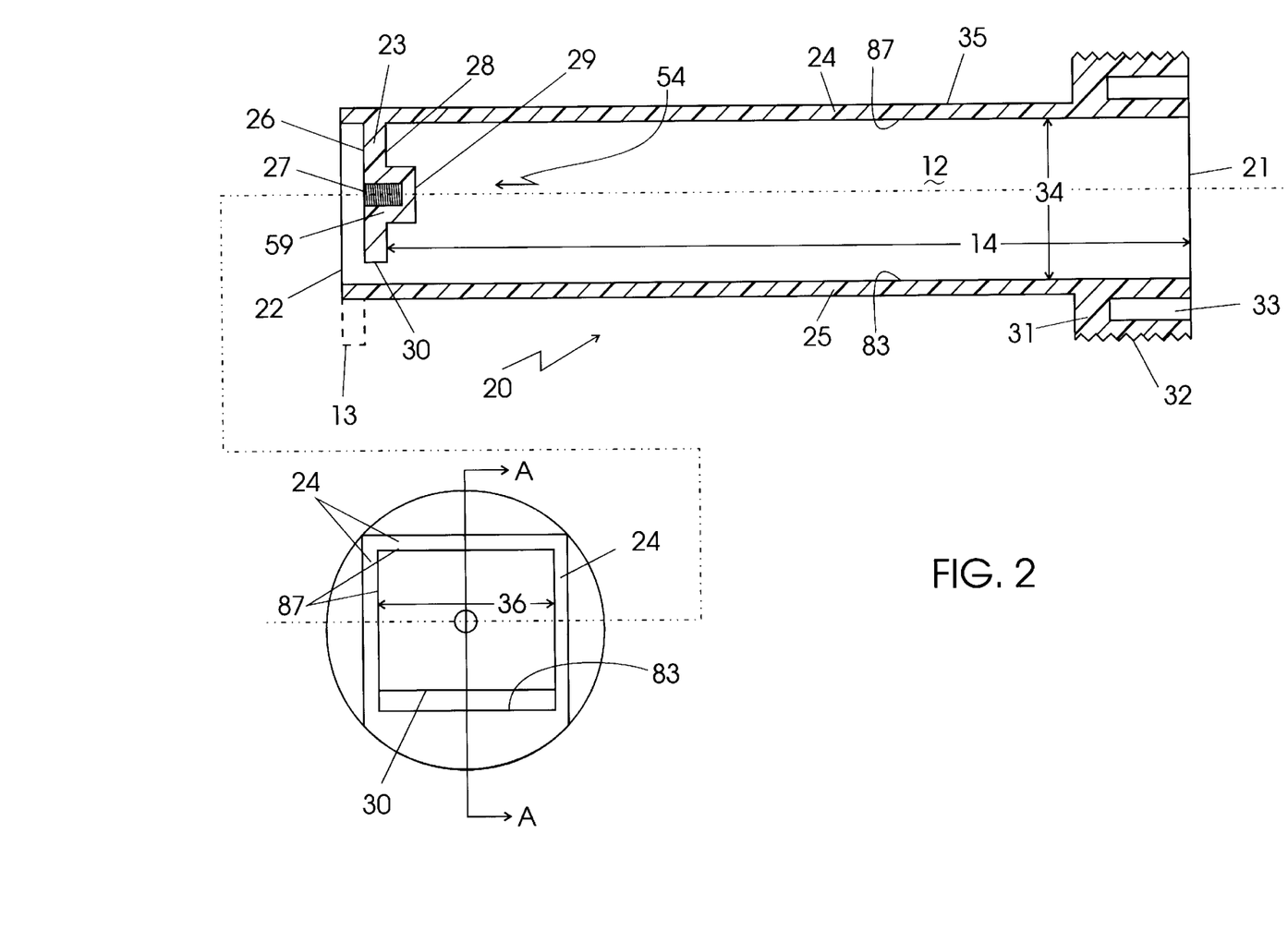
FIG. 2 is a plan and end view of the preferred embodiment of the elongate housing of the solid foods dispenser of FIG. 1, the plan view shown in section A—A of the end view.

As readily observed in FIG. 2, elongate housing 20 is generally rectangular in internal cross section having rectilinear structural walls 24, 25 terminating in ends 21, 22. Housing 20 has an internal height 34 as measured from inside surface 83 of structural wall 25 to a corresponding inside surface 87 of wall 24 and a interior width 36 as measured between opposing inside surfaces 87 of side walls 24. Terminal end 21 further has a boss 31 disposed thereon for accepting first closure means 40. Boss 31 extends from terminal end 21 along a portion of the exterior surface 35 of housing 20 and may extend the entire length thereof, however, boss 31 is typically approximately three quarters inch in length and has threaded external periphery 32 formed thereon. Threaded external periphery 32 generally has an Acme triple lead screw thread for rapid mounting and removal of first closure means 40 although a thread having a different number of leads is fully within the scope of this invention. Boss 31 may have recesses 33 disposed therein from terminal end 21 to lessen the weight of housing 20 and hence dispenser 10.

Referring now to FIGS. 1 and 2, terminal end 22 may have a resting foot 13 (shown with dashed lines) formed upon the exterior surface 35 of structural wall 25 roughly corresponding in height to boss 31 such that dispenser 10 may rest level upon a horizontal surface. For ease of manufacture, resting foot 13 is generally omitted. Terminal end 22 has portion 59 of second closure means 50 disposed internally thereof, fixed to and integral with said housing 20, thereby defining a pressure plate 23 within housing 20 for removably receiving and retaining removable die means 70, 70' thereupon. Pressure plate 23 is affixed to the inside surface 87 of each of walls 24 having its bottom surface 30 spaced from inside surface 83 of structural wall 25. Pressure plate 23 generally is contiguous and continuous with walls 24 but may be fixed thereto with webs from each edge thereof Pressure plate 23 has a die face 26 and an internal face 54, internal face 54 having a planar surface 28 with a plug 29 approximately centered thereon extending into chamber 12. Plug 29 and additionally, an insert 17, provide a means for locating blind hole 27 therein from die face 26, blind hole 27 adapted to receive a retaining means 16 therein for fixing die means 70, 70' to die face 26. Plug 29 may further have insert 17, shown spaced inwardly from internal face 54 and adapted to be disposed therein, insert 17 having blind hole 27 formed therein. Plug 29 and planar surface 28 generally correspond to the mating face 101 of a piston 100 of plunger means 95 in order to remove substantially all of the solid material from chamber 12 when mating face 101 is brought to bear against internal face 54. Die face 26 is generally disposed inwardly of terminal end 22 by a distance generally corresponding to the thickness of sides 74, 74' of die means 70, 70', described in greater detail in FIGS. 5a and 5b, so that the ribbon of material exuding from discharge port 82 is generally directed parallel to a center line 19 of dispenser 10. In this manner, the ribbon of material may be directed to a substrate while generally holding dispenser 10 in any orientation from parallel to perpendicular relative to the substrate. Since pressure plate 23 is affixed to inside surfaces 87, pressure plate 23 provides support for die means 70, 70' and accepts and bears the extruding force on the solid edible material generated by advancing means 60. Thus, there is little force upon die means 70, 70' or upon retaining means 16 as the considerable structural support of pressure plate 23 bears substantially the entire force of extrusion and therefore effectively eliminates any problem of the stick of material destroying or dislodging the extrusion die as may occur with prior art devices having a die attached thereto.

As best observed in FIG. 2, chamber 12 of housing 20 is convergingly tapered from loading end 15 to discharge end 11 of dispenser 10 as the structural walls 24, 25, forming chamber 12 are convergingly tapered on inside surfaces 87, 83 respectively from open terminal end 21 to other terminal end 22 throughout the length 14 thereof The taper of structural walls 24, 25 is less than two degrees and is preferably less than one degree. Chamber 12 as shown in FIG. 2 when used for butter or margarine is substantially square in interior configuration and therefore each dimension 34, 36 is approximately one and three-eighths inch at open terminal end 21 while dimension 34, 36 at other terminal end 22 more closely match the dimensions of the stick of butter or margarine at one and one quarter inch each. Thus, over the length 14 of chamber 12, the taper of each wall is more preferably about six tenths of one degree. Although chamber 12 is shown as substantially square, the interior width 36 may be greater than the internal height 34 in order to accommodate a stick of solid edible food of unequal rectilinear dimensions.

Figures 4, 5A, 5B:
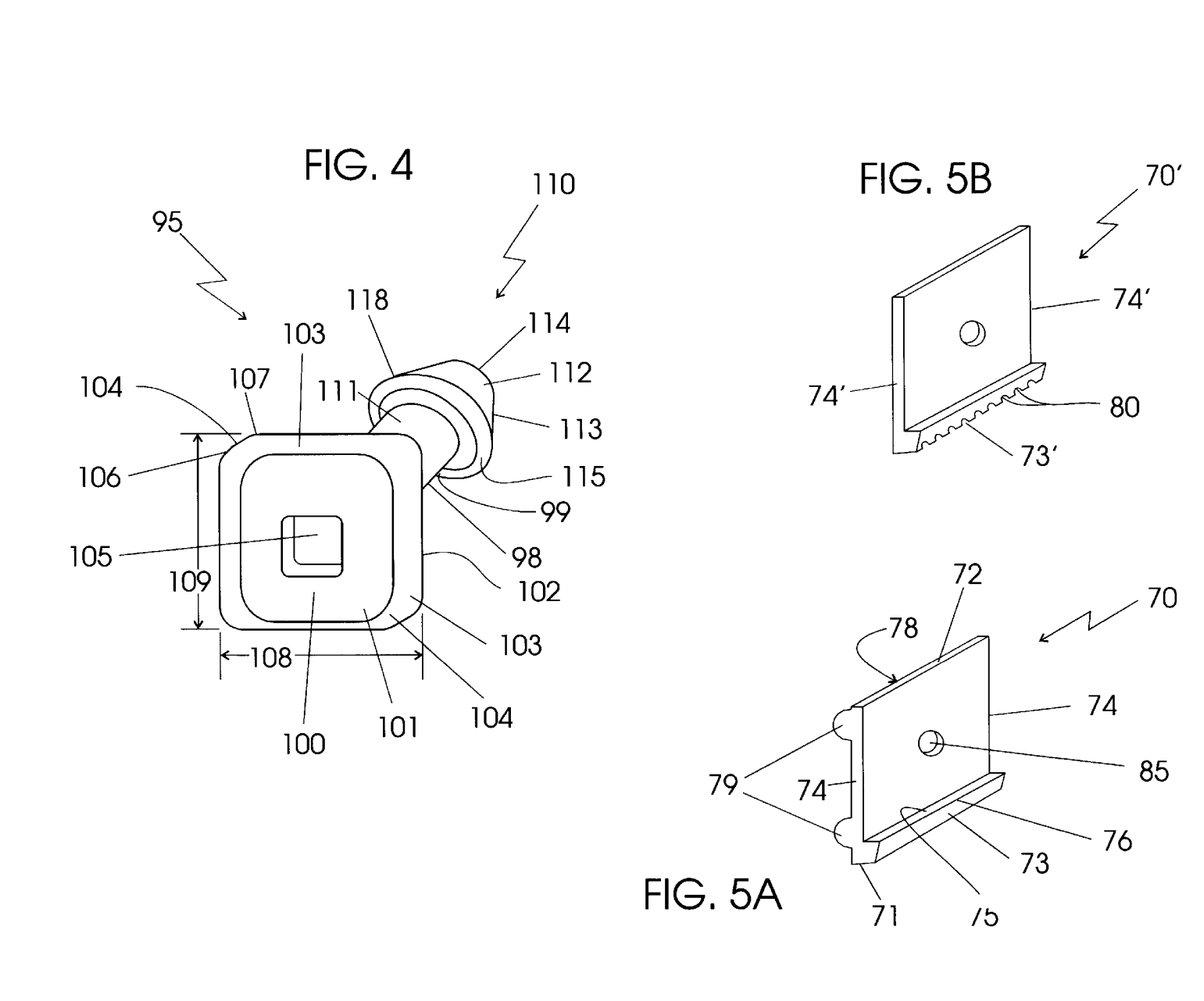
FIG. 4 is an enlarged perspective view of the plunger of the solid foods dispenser of FIG. 1.
FIG. 5a is a perspective view of a removable die means of the solid foods dispenser of FIG. 1.
FIG. 5b is perspective view of another removable die means of the solid foods dispenser of FIG. 1.

Referring now to FIGS. 1 and 4, flexible elastomeric plunger means 95 comprises a piston 100, a shaft 111 and a retaining means 110, piston 100 being integral with one end 98 of shaft 111, retaining means 110 further comprising a head 112 being integral with the other end 99 of shaft 111. Piston 100 has mating face 101 with a mating hole 105 therein, a pressure face 102 opposite mating face 101 and orthogonal edges 103 with comers 104 joining orthogonal edges 103. Each orthogonal edge 103 has a compound curvature comprising mating face curvature 106 and rear face curvature 107, mating face curvature 106 adapted for wiping surface contact with the inside surfaces 83, 87 of chamber 12 and rear face curvature 107 cooperating with the elongation of shaft 111 upon withdrawal of advancing means 60 producing a one-way valve effect between inside surfaces 83, 87 of chamber 12 and piston 100 as will hereinafter be more fully described. As backing washer 90 substantially fully supports pressure face 102 of piston 100, orthogonal edges 103 deform slightly when piston 100 is inserted into chamber 12, piston 100 thereby closing and sealing chamber 12 upon advance of advancing means 60. Upon withdrawal of advancing means 60 after removal of closure means 40, there is nothing to provide support to piston 100 and piston 100 therefore releases from walls 83, 87 upon retraction from chamber 12. Thus, the one-way valve effect of closing and sealing upon advance and releasing upon retraction is established. In the preferred embodiment, rear face curvature 107 and mating face curvature 106 are substantially equal however, rear face curvature 107 may have a greater or lesser radius than mating face curvature 106. Hence, a means to retract 130 comprising rear face curvature 107 of piston 100, shaft 111 and end cap 41 allows for rapid reloading of dispenser 10.

Referring also to FIG. 2, piston 100 has a breadth 108 and a height 109 as measured over opposing orthogonal edges 103, breadth 108 being just sightly larger than interior width 36 and height 109 being just slightly larger than internal height 34 where internal height 34 and interior width 36 are measured at terminal end 21 of chamber 12. Thus, piston 100 has an interference fit at loading end 15 of dispenser 10, the interference fit increasing toward discharge end 11 such that a wiping surface contact is maintained throughout the length 14 of chamber 12. The wiping surface contact of mating face curvature 106 of orthogonal edges 103 ensures that all of the solid stick of edible material is moved along the axis 18 of dispenser 10 and is presented for discharge at discharge end 11. Retaining means 110 comprises head 112 tapered from a ridge 118 to a terminal end 114 creating an outside surface taper 113 for ease of insertion into the reduced end 69 of 5 screw shaft 61 of advancing means 60. Ridge 118 is greater in diameter than the diameter of shaft 111 thus creating a vertical wall 115 from the outside diameter of shaft 111 to ridge 118. Wall 115 is adapted to matingly engage an internal wall 120 formed in through hole 68 of screw shaft 61 to retain plunger means 95 therein as will hereinafter be described in fuller detail.

Figure 6:
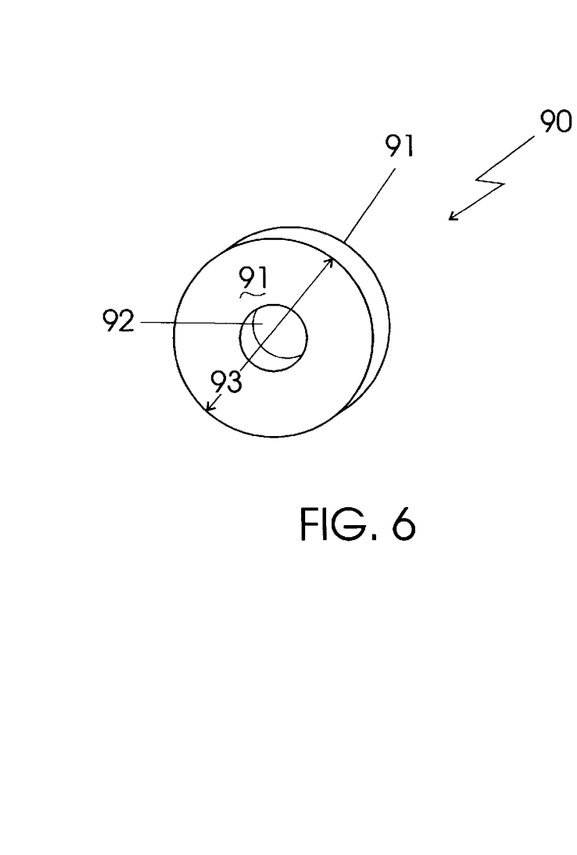
FIG. 6 is an enlarged perspective view of the backing washer for the plunger of the solid foods dispenser of FIG. 1.

Referring now to FIGS. 1, 4 and 6, a backing washer 90 is disposed upon shaft 111 of plunger means 95 before insertion into retaining end 67 of screw shaft 61, backing washer 90 adapted to transfer force from screw shaft 61 to pressure face 102 of piston 100. In the preferred embodiment shown, backing washer 90 has opposing faces 91, a through hole 92 and an outside diameter 93 of approximately one and one quarter inch. Through hole 92 is slightly larger in diameter than shaft 111 for a sliding fit thereupon. The thickness of backing washer 90 between opposing faces 91 is approximately one sixteenth inch but may be more or less as long as backing washer 90 can transfer the force from screw shaft 61 through plunger means 95 and effect the extrusion of the solid stick of edible food through discharge port 82. Alternately, backing washer 90 may be cup shaped wherein one face 91 has a recess roughly corresponding to the length and diameter of protruding portion 121. Thus, the one face 91 comprises two bearing surfaces abutting terminal end 122 of protruding portion 121 and an end of threads 123. In yet another embodiment, threads 123 may extend to terminal end 122 of protruding portion 121 and a flat thermoplastic or metallic washer may be utilized to transfer the force from screw shaft 61 to pressure face 102 of piston 100.

Figure 3:
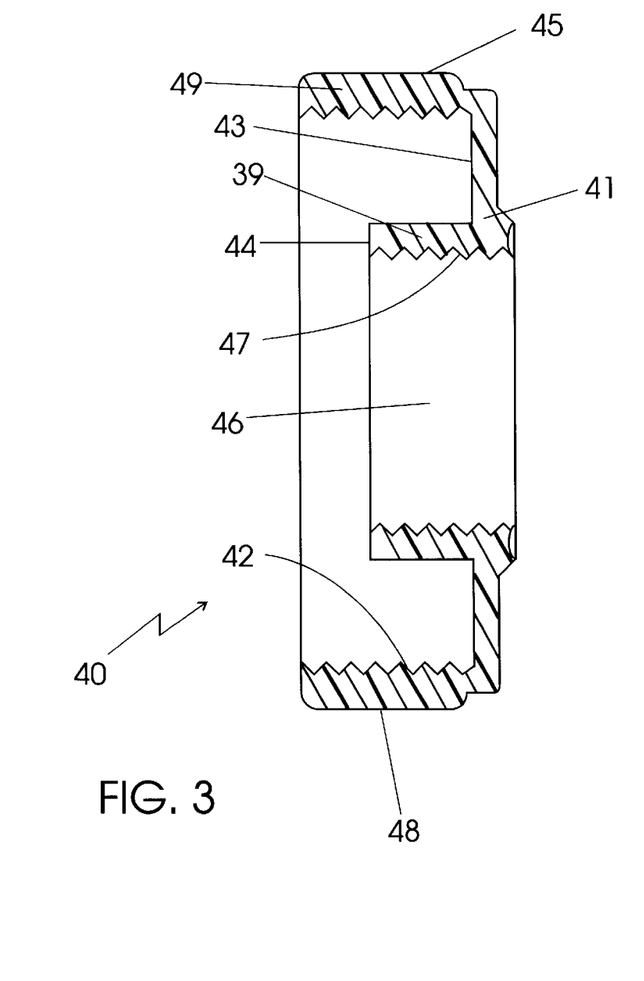
FIG. 3 is an enlarged section view of the end cap of the first closure means of the solid foods dispenser of FIG. 1.

Referring now to FIGS. 1 and 3, first closure means 40 comprises an end cap 41 having internal threads 42 adapted to be threadingly engaged upon open terminal end 21 of elongate housing 20, first closure means 40 receiving a screw shaft 61 of advancing means 60 in a hole 46 in the center thereof. Internal threads 42 have a multiple lead adapted for rapid removal of first closure means 40 from elongate housing 20. First closure means 40 comprises an end cap 41 having internal threads 42 disposed on the inside of a peripheral wall 49, peripheral wall 49 bounded by an end wall 43. Internal threads 42 of first closure means 40 are typically an Acme triple lead screw thread adapted to mate with threaded external periphery 32 of boss 31 on the loading end 15 of housing 20. A thread having a different number of leads is fully within the scope of this invention as long as the lead and thread match between threaded external periphery 32 and internal threads 42. The triple lead thread allows for rapid removal of advance means 60 from dispenser 10. Outer surface 45 of peripheral wall 49 has wrench flats 48 disposed thereon for ease of gripping while removing end cap 41. Alternately, backing washer 90 may be cup shaped wherein one face 91 has a recess roughly corresponding to the length and diameter of protruding portion 121. Thus, the one face 91 comprises two bearing surfaces abutting terminal end 122 of protruding portion 121 and an end of threads 123. In yet another embodiment, threads 123 may extend to terminal end 122 of protruding portion 121 and a flat thermoplastic or metallic washer may be utilized to transfer the force from screw shaft 61 to pressure face 102 of piston 100. Hole 46 is disposed through end wall 43 and an internal boss 39, internal boss 39 formed integrally with end wall 43 having an internal face 44 opposite end wall 43. Hole 46 has threads 47 formed therein, threads 47 adapted to mate with external threads 123 on shaft 61 of advance means 60. In the preferred embodiment, threads 47 are 1–12 UNC machine threads however any suitable thread is within the scope of this invention. Threads 47 are shown as extending completely through internal boss 39 and end wall 43 from internal face 44 to provide for rotational stability for shaft 61 however, threads 47 could be disposed only in end wall 43, only within internal boss 39 or any combination thereof Thus, removable first closure means 40 has advance means 60 associated therewith, advance means 60 having a plunger means 95 on a retaining end 67 thereof positioned in housing 20 and movable along the longitudinal axis 18 of dispenser 10, advance means 60 forcing at least one solid stream of a stick of solid edible material through discharge slot 82.

Advance means 60 as shown in FIG. 1 comprises a threaded screw shaft 61 having a retaining end 67 spaced from a handle end 62, retaining end 67 having plunger means 95 inserted therein with backing washer 90 disposed between retaining end 67 and plunger means 95. Retaining end 67 has protruding portion 121 comprising a reduced end 69 formed thereon, protruding portion 121 terminating in terminal end 122. Reduced end 69 of protruding portion 121 forms a vertical internal wall 120 at the juncture of through hole 68 and reduced end 69, internal wall 120 adapted to retain wall 115 of head 112 of plunger means 95 thereagainst. Through hole 68 at reduced end 69 is slightly larger in internal diameter than shaft 111 of plunger means 95 such that through hole 68 of protruding portion 121 of shaft 61 may rotate freely upon shaft 111.

Handle end 62 of advance means 60 comprises handle 63 having a prolate offset 64 with a finger hole 65 adjacent a recess 66, recess 66 and finger hole 65 disposed into handle 63 from an open end 81 thereof with through hole 68 formed through open end 81 extending though shaft 61 and protruding portion 121. Thus, shaft 61 is hollow for ease of manufacture as well as material and weight savings. Finger hole 65 is approximately five eighths inch in diameter having its center line 124 approximately two inches from center line 19 with a web 125 separating finger hole 65 from recess 66. Thus, finger hole 65 functions as an offset crank allowing for rapid advance of shaft 61 through end cap 41 while providing mechanical advantage means for advancing the stick.

Referring now to FIGS. 1, 2 and 5a, removable die means 70 is generally a rectilinear block of material having a discharge edge 71, a top edge 72, a bottom 73, sides 74, a mating face 77 and an external face 78, mating face 77 adapted to mate with die face 26 of portion 59 having ledge 75 disposed contiguous with bottom surface 30 of portion 59. A sharp edge 76 is defined between ledge 75 and discharge edge 71, sharp edge 76 substantially aligning with planar surface 28 of portion 59. As the length of side 74 is slightly less than the internal height 34 of chamber 12 at discharge end 11, clearance 84 between discharge edge 71 and inside surface 83 is substantially less than the length of discharge edge 71. Thus, when expressed from chamber 12 through discharge port 82, dispenser 10 dispenses at least one ribbon of solid edible material having a width substantially greater than the thickness thereof Die means 70 may have feet 79 protruding from external face 78 such that dispenser 10 may stand upright when placed upon feet 79. Feet 79 are shown as semicircular protrusions of narrow width but may be any other shape or configuration. Die means 70 further has a mounting hole 85 approximately centrally located in and disposed through from external face 78 through mating face 77 adapted to align with blind hole 27 disposed in plug 29 of portion 59. Blind hole 27 may be threaded to accept a threaded shaft of retaining means 16 and mounting hole 85 may further have a countersink 86 disposed into external face 78 corresponding to a tapered head of retaining means 16. The thickness of the solid stream of edible material is determined by the size of clearance 84 that is changeable utilizing an other of die means 70 having a shorter height of sides 74 and hence a greater height of discharge port 82 when such other die means 70 is affixed to portion 59.

In an alternative embodiment shown in FIG. 5b, die means 70' has multiple serrations 80 disposed into bottom 73' thereby creating multiple discharge ports 82. Serrations 80 typically have equal width and depth thus creating discharge ports 82 of similar size thereby dispensing a ribbon comprising multiple streams of solid edible material each said stream having a width substantially equal to the thickness thereof. In this alternative embodiment, sides 74' of die means 70' are typically the same length as internal height 34 of chamber 12 at discharge end 11 such that bottom 73' is substantially contiguous with inside surface 83 such that the multiple streams are distinct and separate, however, sides 74' may be less than the internal height 34 of chamber 12 thus providing a single ribbon of solid material having raised portions created thereupon by the solid material passing through serrations 80. Of course, serrations 80 may be semicircular or any other configuration without departing from the scope of this invention.

Referring again to FIG. 1, dispenser 10 is assembled by first threading shaft 61 through end cap 41 by inserting protruding portion 121 into hole 46 from end wall 43 with protruding portion 121 extending beyond internal face 44 of end cap 41. Finger hole 65 may be utilized to spin advance means 60 within threads 47 through hole 46 or end cap 41 may be spun upwardly on shaft 61 as a nut is spun onto a threaded shaft in a conventional manner. Backing washer 90 is then forced over head 112 of plunger means 95 by inserting terminal end 114 of head 112 into through hole 92 within backing washer 90 and forcing backing washer 90 thereonto. Plunger means 95 is then inserted into protruding portion 121 of shaft 61 by inserting terminal end 114 of head 112 into through hole 68 in reduced end 69 and forcing head 112 into the larger portion of through hole 68 beyond internal wall 120. Backing washer 90 should abut pressure face 102 of piston 100 and wall 115 of head 112 should register with and abut internal wall 120. Once inserted into reduced end 69, plunger means 95 is fixedly retained therein and shaft 111 must be severed in order to remove plunger means 95 from shaft 61 thus eliminating the possibility of plunger means 95 being separated from advance means 60. Thus, first closure means 40 is fully assembled and ready for mounting within and upon open terminal end 21 of housing 20.

Die means 70, 70' is selected and placed upon other terminal end 22 of housing 20 with ledge 75 disposed under bottom surface 30 of pressure plate 23 having mounting hole 85 aligning with blind hole 27 in pressure plate 23 while mating face 77 abuts die face 26. Retaining means 16 may then be inserted through mounting hole 85 and be fixedly retained in blind hole 27. For instance, blind hole 27 may be threaded and a threaded shaft of retaining means 16 having a tapered head may be threaded into blind hole 27 thereby capturing die means 70, 70' against die face 26 of pressure plate 23. Thereafter, housing 20 is ready to receive a stick of solid edible material therein.

In operation, dispenser 10 has a stick of solid edible material inserted into open terminal end 21 of housing 20, the solid stick adapted to slide freely toward pressure plate 23 abutting internal face 54 at plug 29. First closure means 40 is brought into proximity with open terminal end 21 of housing 20 and plunger means 95 is inserted into chamber 12 with mating face 101 facing the stick of solid edible material. End cap 41 of first closure means 40 is then threaded upon threaded external periphery 32 of boss 31, threads 42 rapidly advancing upon threaded external periphery 32 as these cooperating threads are generally triple lead threads. Advance means 60 moves plunger means 95 into contact with the stick of solid edible material and toward pressure plate 23 sufficiently to ensure that the stick of solid edible material also bears against internal face 54. Once fully readied for use, dispenser 10 is brought in proximity with the surface of a substrate such as toast and handle end 62 of advance means 60 is rotated utilizing finger hole 65 pressing plunger means 95 against the stick of solid edible material. Orthogonal walls 103 of plunger means 95 deform slightly as plunger 95 is inserted into and moved through chamber 12 flattening a portion of walls 103 and squaring corners 104 thereby producing a wiping force against walls 83, 87 thereof thus removing the need of having a first guiding platform smaller than a second sealing platform as was utilized in the prior art. The force of plunger means 95 against the solid stick presses the stick against pressure plate 23 that causes a portion of the stick to be exuded through clearance 84 under discharge edge 71 of discharge port 82 parallel to longitudinal axis 18 of dispenser 10 and onto the substrate. As dispenser 10 is moved along the substrate, a ribbon of solid material is laid upon the substrate as desired. Upon laying down the desired amount, rotation of handle end 62 is ceased causing the flow of solid material to be interrupted. As the solid edible material possesses little strength in a thin ribbon, the ribbon of material may be easily broken by rotating dispenser 10 upwardly away from the substrate, wiping terminal end 22 upon the substrate or by withdrawing dispenser 10 from the area of the substrate in a direction parallel to the axis 18 of dispenser 10. Hence there is no need to slice off the protruding portion of the solid stick of edible material with a knife as is prevalent in the prior art.

After breaking the ribbon, another ribbon may be laid down on the substrate or dispenser 10 may be laid aside for later use. When dispenser 10 is empty and a new stick of solid material needs to be inserted, first closure means 40 may be rapidly removed from housing 20 by unscrewing end cap 41 and withdrawing advance means 60 from chamber 12. In order to provide for rapidly reloading of dispenser 10, means to retract 130 allows for rapid removal of advance means 60 as shaft 111 of plunger means 95 elongates upon withdrawal of advance means 60 cooperating with rear face curvature 107 of piston 100 producing a one-way valve effect between structural walls 24, 25 of chamber 12 and piston 100. In addition to shaft 111 elongating, piston 100 folds slightly forward in the direction of mating face 101 thereby allowing rear face curvature 107 to contact inside surfaces 83, 87 of chamber 12 and slide easily thereupon. After removal of first closure means 40, end cap 41 may be spun downwardly toward plunger means 95 in order to replace first closure means 40 upon the new stick of solid edible material before beginning the next discharge operation thus avoiding the need to back out the threaded shaft entirely through the closure before removing the closure and inserting another stick. End cap 41 is spun downwardly as a nut is spun upon a threaded shaft and as end cap 41 was spun upwardly upon shaft 61 at assembly of advance means 60. Therefore, dispenser 10 has plunger means 95 force fit within chamber 12 and operable in a first direction to provide for wiping contact with walls 83, 87 thereof and having a locational interference fit therewithin and operable in an opposed direction to provide for substantially free sliding contact with walls 83, 87 upon withdrawal from chamber 12. Finally, there is no need to clean the screw shaft 61 as in the prior art as the shaft does not penetrate the stick.

In a method of making a solid-foods dispenser 10 adapted to receive a stick of solid edible material and dispense the material in a solid stream onto a substrate, dispenser 10 is formed as an elongate housing 20 having rectilinear structural walls 24, 25 bounded by terminal ends 21, 22, one of terminal ends 21, 22 defining a loading end 15 of dispenser 10, the one terminal end 21 having first removable closure means 40 associated therewith, the other of terminal ends 21, 22 defining a discharge end 11 of dispenser 10, other terminal end 22 having a portion 59 of a second closure means 50 fixed to and integral with housing 20, portion 59 defining a pressure plate 23 formed within housing 20 for removably receiving and retaining removable die means 70 thereupon. Referring to FIGS. 1 and 2, elongate housing 20 may be injection molded from a thermoplastic material into a rectilinear tube having pressure plate 23 formed in terminal end 22 thereof, pressure plate 23 substantially closing terminal end 22 while a boss 31 is formed upon the exterior surface 35 of open terminal end 21. Threads for threaded external periphery 32 are formed upon boss 31 during the injection process as the mold cavity is split longitudinally along axis 18, one half of the mold forming threads upon one half of housing 20 while the other half of the mold forms threads upon the other half of housing 20. Chamber 12 is formed within housing 20 by a rectilinear slide inserted into the closed mold cavity from an end of the mold forming open terminal end 21. The rectilinear slide has tapered surfaces generally tapered approximately one eighth inch per foot or about six tenths of one degree thereby forming tapered inside surfaces 87, 83 on structural walls 24, 25 respectively. The terminal end of the rectilinear slide has a recess machined therein for forming plug 29 of pressure plate 23 while the opposite end of the rectilinear slide has protrusions extending therefrom parallel to longitudinal axis 18 for forming recesses 33 in boss 31. Die face 26, bottom surface 30 of pressure plate 23 and optional resting foot 13 are formed in a fixed portion of the injection mold, the fixed portion having a protrusion extending outwardly from a face of the mold, the protrusion forming bottom surface 30. The extensions of structural walls 24 and 25 and optional resting foot 13 are formed in respective recesses into the face of the fixed end of the mold. Thus, housing 20 is formed in a closed cavity and removed therefrom by first retracting the rectilinear slide forming chamber 12 and recesses 33, then splitting the mold along axis 18 leaving housing 20 cantilevered from the fixed portion of the mold. Housing 20 may then be readily removed from the recesses forming the bottom surface 30 of pressure plate 23, the ends of structural walls 24, 25 and optional resting foot 13, portion 59 defining pressure plate 23 formed within housing 20 adapted for removably receiving and retaining removable die means 70 thereupon, pressure plate 23 being permanently fixed to and integral with housing 20. Blind hole 27 is formed into portion 59 from die face 26 into plug 29, blind hole 27 terminating short of internal face 54 and may be threaded to accept a threaded shaft of retaining means 16. Internal face 54 may further have an insert 17 disposed in a cavity 37 in plug 29, insert 17 having blind hole 27 extend thereinto. When used, insert 17 is press fit into cavity 37 from internal face 54, insert 17 abutting a shoulder 38 in cavity 37. Retaining means 16 is typically a tapered head machine screw available from screw machine shops. Therefore, a second closure means 50 is formed on discharge end 11 of dispenser 10 allowing interchangeable die means 70 to be associated therewith.

Plunger means 95 is formed from a flexible elastomeric material and comprises a piston 100 with a mating face 101 configured to mate with the interior face 54 of second closure means 50, a shaft 111 formed on the rear pressure face 102 of piston 100 terminating in head 112, head 112 adapted to be fixedly engaged with a protruding portion 121 of shaft 61 of advance means 60. Plunger means 95 is typically injection molded or transfer molded from a low durometer thermosetting elastomer such as a fluoroelastomer, silicone, urethane, halogenated polymer or other food grade elastomeric material. As with housing 20, plunger means 95 is formed in a split half mold, each half of the mold forming one half of piston 100, one half of shaft 111 and one half of head 112 while the mating hole 105 is formed by a protrusion into the mold cavity from a fixed plate of the mold. Upon injection of the elastomer into the cavity, the mold is split into the two parts along a central parting line and plunger means 95 removed therefrom.

Referring again to FIGS. 1, 2 and 5a, removable die means 70 is generally a rectilinear block of material formed from a thermoplastic material or metal and having a discharge edge 71, a top edge 72, a bottom 73, sides 74, a mating face 77 and an external face 78, mating face 77 adapted to mate with die face 26 of portion 59 while having ledge 75 disposed contiguous with bottom surface 30 of portion 59. Die means 70 may be machined from a piece of material or may be injection molded in a closed mold with a parting line along either mating face 77 or external face 78. A sharp edge 76 is defined between ledge 75 and discharge edge 71, sharp edge 76 adapted to substantially align with planar surface 28 of portion 59. As the length of side 74 is slightly less than the internal height 34 of chamber 12, clearance 84 between discharge edge 71 and inside surface 83 is substantially less than the length of discharge edge 71.

Die means 70 may have feet 79 protruding from external face 78 such that dispenser 10 may stand upright when placed upon feet 79. Feet 79 are shown as semicircular protrusions of narrow width but may be any other shape or configuration. Die means 70 further has a mounting hole 85 approximately centrally located in and disposed through from external face 78 through mating face 77 adapted to align with blind hole 27 disposed in plug 29 of portion 59. When injection molded of a thermoplastic material, mating face 77 is defined on a face of one half of the mold with ledge 75 being machined as a recess into the face of the mold defining sharp edge 76 at the base of the recess with one wall of the recess defining ledge 75 while the other wall of the recess defines discharge edge 71.

Die mounting hole 85 is formed through die means 70 from the second surface of the mold, the second surface having a protrusion extending therefrom for forming mounting hole 85, the protrusion further having a mirror image of countersink 86 formed thereon at the second face of the mold. The second face of the mold defines external face 78 and may have recesses for forming feet 79 therein.

Backing washer 90 may be obtained from machine shops and hardware outlets carrying 18-8 stainless steel flatwashers. Backing washer 90 is typically a one half inch bolt size flatwasher having the inside diameter of through hole 92 equal to seventeen thirty-secondths of an inch and may be the aforementioned stainless steel washer or may alternately be made from thermoplastic or other metallic material. Alternately, backing washer 90 may be formed from a thermoplastic rod having through hole 92 drilled centrally therethrough with a cup shaped portion corresponding to the length and diameter of protruding portion 121. Thus, backing washer 90 may rotate freely upon shaft 111 of plunger means 95.

Advance means 60 is formed as an elongate tube having a hollow shaft 61 with threads 123 formed upon the external surface thereof and a through hole 68 formed centrally therein. Referring to FIGS. 1 and 2, advance means 60 may be injection molded from a thermoplastic material into a circular tube having handle end 62 formed on one end thereof, handle end 62 comprising a handle 63 with a prolate offset 64 formed eccentrically from the center line 19. Handle 63 further has a recess 66 formed in the major portion thereof with web 125 separating recess 66 from finger hole 65. In order to mold advance means 60 a mold cavity is split longitudinally along center line 19, one half of the mold adapted for forming threads 123 and the exterior portion of reduced end 69 on one half of shaft 61 while the other half of the mold is adapted to form threads 123 and the exterior portion of reduced end 69 upon the other half of shaft 61. Mounting hole 85 is formed within shaft 61 by a rod like slide inserted into the closed mold cavity from an end of the mold forming handle 63. The rod like slide has a reduced end portion opposite handle 63 for forming reduced end 69 thereupon and has enlarged portions at handle end 62 for forming recess 66 and finger hole 65. Thus, advance means 60 is formed in a closed cavity and removed therefrom by first retracting the rod like slide forming through hole 68, recess 66 and finger hole 65 and then splitting the mold along center line 19 leaving advance means 60 lying in one half of the mold. Advance means 60 may then be readily removed from the mold half.

End cap 41 of first closure means 40 is injection molded in a blind cavity having the outer surface 45 and the back of end wall 43 machined into the blind cavity. Wrench flats 48 are likewise formed in the cavity in the portion of the cavity forming outer surface 45. A threaded insert for forming threads 42 on the inside of peripheral wall 49 is placed into the mold cavity, the threaded insert having a recess for forming internal boss 39 and internal face 44 machined thereinto. An internal cylinder forms one wall of the recess, the internal cylinder forming hole 46 thereupon. The mold cavity is closed and thermoplastic material is injected thereinto forming end cap 41. Upon completion of the molding process, the mold is opened and end cap 41 withdrawn with the threaded insert. End cap 41 is threadingly removed from the threaded insert and threads 47 are machined into hole 46.

While the present invention has been described with reference to the above described preferred embodiments and alternate embodiments, it should be noted that various other embodiments and modifications may be made without departing from the spirit of the invention. Therefore, the embodiments described herein and the drawings appended hereto are merely illustrative of the features of the invention and should not be construed to be the only variants thereof nor limited thereto.

We claim:

1. In a solid-foods dispenser adapted to receive a stick of solid edible material and dispense the material in at least one ribbon of desired thickness, said solid-foods dispenser comprising an elongate housing having structural walls defining a chamber bounded by terminal ends, said chamber having an internal configuration generally corresponding to the configuration of the stick of material to be dispensed, a first closure means associated with a loading end of said solid-foods dispenser and adapted to be removingly engaged from open terminal end of said housing, a second closure means carried by said housing, said second closure means having an internal face facing toward said chamber, a plunger means positioned in said housing and movable from a position spaced from said second closure means along the longitudinal axis of said dispenser to a position adjacent said second closure means, said plunger means having a mating face configured to mate with said internal face, advancing means associated with said first closure means, said housing and said plunger means operable to move said plunger means through said housing in the direction of said second closure means, the improvement wherein said second closure means is positioned substantially adjacent the discharge end of said dispenser, has a portion thereof fixed to said housing adapted to receive removable die means, said portion fixed to an inside surface of said housing providing a buttress to support said structural walls of said discharge end, said die means defining a clearance between a discharge edge thereon and a bottom wall of said chamber and wherein said plunger means comprises a piston, a shaft and a retaining means, said piston being integral with one end of said shaft and said retaining means comprising a head being integral with the other end of said shaft.

2. A solid-foods dispenser as in claim 1 wherein said removable die means dispenses at least one ribbon of solid edible material having a width substantially greater than the thickness thereof.

3. A solid-foods dispenser as in claim 1 wherein said removable die means has multiple ports thereby dispensing a ribbon comprising multiple streams of solid edible material each said stream having a width substantially equal to the thickness thereof.

4. A solid-foods dispenser as in claim 1 wherein said chamber of said dispenser is convergingly tapered from said loading end to said discharge end thereof.

5. A solid-foods dispenser as in claim 4 wherein said chamber is comprised of structural walls, each of said walls forming said chamber convergingly tapered from said open terminal end to said other terminal end thereof.

6. A solid-foods dispenser as in claim 5 wherein said taper of said structural walls is less than two degrees.

7. A solid-foods dispenser as in claim 6 wherein said taper of said structural walls is preferably less than one degree.

8. A solid-foods dispenser as in claim 7 wherein said taper of said structural walls is preferably six tenths of one degree.

9. A solid-foods dispenser as claimed in claim 1 wherein said portion bears substantially the entire force of extrusion generated by said advancing means thereby substantially reducing force upon said die means.

10. In a solid-foods dispenser adapted to receive a stick of solid edible material and dispense the material in at least one ribbon of desired thickness, said solid-foods dispenser comprising an elongate housing having structural walls defining a chamber bounded by terminal ends, said chamber having an internal configuration generally corresponding to the configuration of the stick of material to be dispensed, a first closure means associated with a loading end of said solid-foods dispenser and adapted to be removingly engaged from an open terminal end of said housing, a second closure means carried by said housing, said second closure means having an internal face facing toward said chamber, a plunger means positioned in said housing and movable from a position spaced from said second closure means along the longitudinal axis of said dispenser to a position adjacent said second closure means, said plunger means having a mating face configured to mate with said internal face, advancing means associated with said first closure means, said housing and said plunger means operable to move said plunger through said housing in the direction of said second closure means, the improvement wherein said second closure means is positioned substantially adjacent the discharge end of said dispenser, has a portion thereof fixed to said housing adapted to receive removable die means, said die means defining a clearance between a discharge edge thereon and a bottom wall of said chamber and wherein said plunger means is made from a flexible elastomeric material and comprises a piston, a shaft and a retaining means, said piston being integral with one end of said shaft and said retaining means comprising a head being integral with the other end of said shaft.

11. A solid-foods dispenser as in claim 10 wherein said piston has a width and breadth, said width greater than the interior dimension of the width of said chamber and said breadth greater than the interior dimension of the breadth of said chamber.

12. A solid-foods dispenser as in claim 11 wherein said piston has a compound curvature comprised of a mating face curvature and a rear face curvature on each of its orthogonal edges, said mating face curvature adapted for wiping surface contact with the interior surfaces of said chamber.

13. A solid-foods dispenser as in claim 10 wherein said plunger means has a force distributing washer disposed upon said shaft intermediate a pressure face of said piston and the terminal end of a screw shaft of said advancing means.

14. A solid-foods dispenser as in claim 10 wherein said shaft of said plunger means elongates upon withdrawal of said advancing means cooperating with a rear face curvature of said piston producing a one-way valve effect between said walls of said chamber and said piston.

15. In a solid-foods dispenser adapted to receive a stick of solid edible material and dispense the material in a solid stream onto a substrate, said dispenser comprising an elongate housing having rectilinear structural walls bounded by terminal ends, one of said terminal ends defining a loading end of said dispenser, said one terminal end having removable closure means associated therewith, the other of said terminal ends defining a discharge end of said dispenser, said other terminal end having a portion of said closure means fixed to and integral with said housing, the improvement wherein said portion defines a pressure plate within said housing for removably receiving and retaining removable die means thereupon, said pressure plate fixed to an inside surface of said housing providing a buttress to support said structural walls of said discharge end and wherein said removable closure means has advancing means carried thereby, said advancing means having a plunger means on one end thereof for moving through said elongate housing, said plunger means comprising a piston, a shaft and a retaining means, said piston being integral with one end of said shaft and said retaining means comprising a head being integral with the other end of said shaft.

16. A solid-foods dispenser as in claim 15 wherein said die means defines at least one discharge slot between a discharge edge of said die means and an interior surface of one of said structrual walls.

17. A solid-foods dispenser as in claim 16 wherein said removable closure means has advance means associated therewith, said advance means having a plunger means on one end thereof positioned in said housing and movable along the longitudinal axis of said dispenser, said advance means forcing at least one solid stream of said stick of solid edible material through said discharge slot.

18. A solid-foods dispenser as in claim 17 wherein said solid stream is a ribbon of desired thickness having a width substantially greater than the thickness thereof.

19. A solid-foods dispenser as in claim 17 wherein said removable die means has multiple discharge ports thereby dispensing a ribbon comprising multiple streams of solid edible material each said stream having a width substantially equal to the thickness thereof.

20. A solid-foods dispenser as claimed in claim 15 wherein said portion bears substantially the entire force of extrusion generated by said advancing means thereby substantially reducing force upon said die means.

\* \* \* \* \*